(12) United States Patent
Sato

(10) Patent No.: US 7,079,273 B2
(45) Date of Patent: Jul. 18, 2006

(54) PRINT MANAGEMENT SERVER, PRINTING MANAGEMENT SYSTEM AND PRINTING METHOD

(75) Inventor: Hirokazu Sato, Hino (JP)

(73) Assignee: Konica Corporation, Tokyo (JP)

( * ) Notice: Subject to any disclaimer, the term of this patent is extended or adjusted under 35 U.S.C. 154(b) by 864 days.

(21) Appl. No.: 10/075,361

(22) Filed: Feb. 14, 2002

(65) Prior Publication Data

US 2002/0113999 A1 Aug. 22, 2002

(30) Foreign Application Priority Data

Feb. 22, 2001 (JP) .............................. 2001-046544

(51) Int. Cl.
*G06F 3/12* (2006.01)
(52) U.S. Cl. ........................ 358/1.15; 358/1.15; 705/28
(58) Field of Classification Search ............... 358/1.15; 705/28

See application file for complete search history.

(56) References Cited

U.S. PATENT DOCUMENTS 5,960,414 A * 9/1999 Rand et al. .................... 705/28
2002/0113999 A1* 8/2002 Sato ........................ 358/1.15

* cited by examiner

*Primary Examiner*—Douglas Q. Tran
*Assistant Examiner*—Andrew Lam
(74) *Attorney, Agent, or Firm*—Lucas & Mercanti, LLP

(57) ABSTRACT

A print management server comprises a receiving device to receive order data including image data from a customer terminal; a production management information preparing device to prepare production management information to administrate a production amount and a production time for a light sensitive material based on the order data received by the receiving device; a production management information transmitting device to transmit the production management information prepared by the production management information preparing device; and an order data transmitting device to transmit the order data received by the receiving by the device to a printing section terminal.

9 Claims, 11 Drawing Sheets

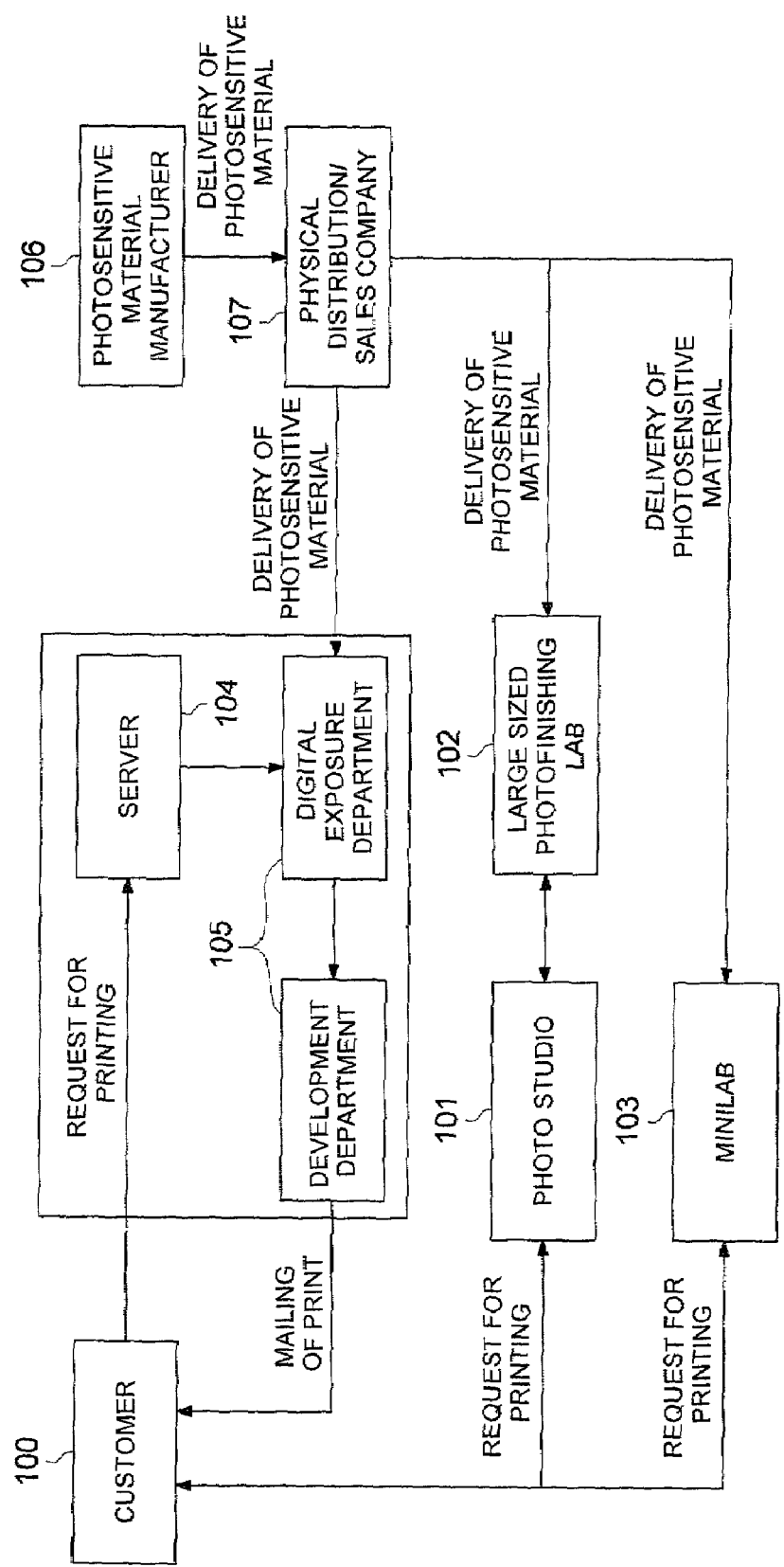

PRINT MANAGEMENT SERVER, PRINTING MANAGEMENT SYSTEM AND PRINTING METHOD

BACKGROUND OF THE INVENTION

The present invention relates to a print management server, printing management system and printing method for management of the printing of image data exchanged via a communications network.

The following describes the prior art procedures for printing a photograph taken by a customer with reference to FIG. 11:

FIG. 11 is a schematic diagram representing the physical distribution and procedures thereof in prior art printing. As shown in FIG. 11, the photograph taken by a customer is printed mainly by the following three methods:

In the first method, a customer 100 takes a negative to an agent such as a photo studio 101 or the like, and requests his or her photograph to be printed. It is exposed, developed and printed at a large-sized photofinishing lab 102. According to this method, negatives collected by multiple agents can be exposed and developed at a large-sized photofinishing lab 102. In this case, however, the negative is handed over to the large sized photofinishing lab 102 through the photo studio 101 from the customer 100 before printing is completed. The completed print must also be handed over to the customer 100 through the photo studio 101 from the large sized photofinishing lab 102. Several days are required from the request of printing to completion of printing.

In the second method, the customer 100 takes a negative directly to a small sized minilab 103 capable of exposure and development, without the intervention of photo studio 101 or other agent. According to this method, printing is completed several hours after the arrival of the negative brought by the customer 100, since exposure and development apparatuses are installed at the minilab.

In the third method, an image data photographed with a digital camera or the like by a customer 100, for example, is sent to a specified server 104 or the like via the communications network, and is exposed and developed by a photofinishing lab 105 equipped with digital exposure and development departments. According to this method, the customer need not visit a shop to request printing. Image data can be sent to a server 04 managed by a company providing printing services via the network. This is a convenient method.

According to three prior art methods for requesting printing described above, the customer 100 can use a negative or digital image data to request printing.

In all the aforementioned cases, a photosensitive material to be used for printing is produced by a photosensitive material manufacturer 106, and is marketed via a physical distribution/sales company 107. This requires physical distribution costs, which in turn raises printing costs.

The aforementioned large sized photofinishing lab 102, minilab 103 or the like engaged in exposure and development normally keeps certain numbers of photosensitive materials in stock to meet possible urgent requirements. Keeping them in stock will result in cost increase due to stocktaking of photosensitive materials, and will also result in secular deterioration of photosensitive materials.

Generally, the photosensitive material comprises multiple compositions of coating liquids which, in turn, comprise a pigment forming coupler and photosensitive silver halide lactic acid produced through crystal growth, chemical sensitizing and pigmentary sensitizing of silver halide particles, which, if required, further contains organic solvent of high boiling point, pigment image stabilizer, ultraviolet ray absorber, fogging inhibitor and binder, as well as surfactant, liquid viscosity regulator, irradiation inhibiting die, silver development inhibitor, fluorescent whitener, membranous quality modifier and hardening agent. Multiple layers of the aforementioned composition of coating liquids are simultaneously applied to a continuously traveling plastic covering paper support, resin film or other similar support, which is dried to produce the photosensitive material. Accordingly, the photosensitive material must be managed and stored with extreme care under certain environmental conditions. If not, secular change will occur and the required performances will be exhibited.

However, in the printing system described above, the photosensitive material manufacturer 106, manufacturer engaged in exposure and development and stores (102, 103, 105, etc.) are independently of one another. The photosensitive material is subjected to various environments before it is used after having been produced, and it is not protected against secular deterioration in the prior art. To reduce the period of storage and to solve this problem, it may be possible to procure the photosensitive material every time an order is placed, but this method requires enormous physical distribution costs, with the result that printing services cannot be provided at low price.

SUMMARY OF THE INVENTION

The present invention has been made to solve these problems. The major object of the present invention is to provide is to provide a printing management server, printing management system and printing method which ensure effective production to reduce the secular change of a photosensitive material, and offer high-quality printing at low price.

To solve the above problems, the present invention provides the following:

(1) A printing management server for photosensitive material production control and printing management connected through a communications line to:

a customer terminal owned by a customer requesting an image data to be printed, a manufacturing department terminal owned by a photosensitive material manufacturing department and a printing department terminal owned by a printing department engaged in printing by using the photosensitive material manufactured by the manufacturing department:

wherein the aforementioned printing management server is further characterized by comprising;

receiving means for receiving from the aforementioned customer terminal a predetermined order data including the image data, production control information creating means for creating production control information for the control of the volume and time of photosensitive material production, based on the order data received by the aforementioned receiving means, production control information transmission means for transmitting to the aforementioned manufacturing department terminal the production control information created by the aforementioned production control information creating means, and order data transmission means for transmitting to the aforementioned printing department terminal the order data received by the aforementioned receiving means.

According to the invention of embodiment (1), production control information for the management of photosensitive material production volume and production time period is created by the production control information creating means based on the order data received from the customer terminal by receiving means, and this production control information is sent to the manufacturing department terminal by the production control information transmission means. This ensures production to be carried out in conformity to the order received from customers, thereby preventing excessive storage or insufficient storage of photosensitive materials. It also allows a production schedule to be formulated in conformity to possible deterioration of photosensitive materials.

Further, order data from customers is sent to the printing department terminal by the order data transmission means, facilitating processing of printing order.

Thus, this embodiment ensures efficient production for minimizing the secular change of photosensitive materials, and provides high-quality printing at low prices at the same time.

(2) A printing management server according to embodiment 1 further characterized by comprising:

printing management information creating means for creating printing management information for scheduled management of printing work based on the order data received by the aforementioned receiving means, and printing management information transmission means for sending to the aforementioned printing department terminal the printing management information created by the aforementioned printing management information creating means.

According to the invention of embodiment (2), the same effect as that of embodiment (1) can be obtained. Not only that, printing management information for scheduled management of printing is created by the printing management information creating means based on the order data. and this printing management information is sent to the printing department terminal by the printing management information transmission means. This enables effective printing in conformity to the amount of order accepted.

(3) A printing management server according to embodiment 1 or 2 further characterized in that the aforementioned production control information creating means creates production control information for adjusting production costs and production time period, thereby ensuring the optimum inventory of the aforementioned photosensitive materials.

According to the invention of embodiment (3), the same effect as that of embodiment (1) or (2) can be obtained. Not only that, the aforementioned production control information provides production control information for adjusting production costs and production time period in such a way as to ensure the optimum inventory of the aforementioned photosensitive materials. This makes it possible to achieve the effective production because management is carried out in such a way that the secular deterioration of photosensitive materials can be minimized while the possibility of insufficient storage is eliminated.

(4) A printing management server according to embodiment 1 further characterized by comprising an optimum inventory volume setting means for setting the optimum inventory volume to ensure that the photosensitive materials can be used up within a predetermined period of use of the aforementioned photosensitive materials, based on the aforementioned order data.

According to the invention of embodiment (4), the same effect as that of embodiment (3) can be obtained. Not only that, the optimum inventory volume setting means allows the optimum inventory volume to be set in such a way that the photosensitive materials can be used up within a predetermined period of use of photosensitive materials, based on the aforementioned order data. This permits photosensitive materials to be consumed before the time of performance deterioration, and eliminates the need of excessive management of photosensitive materials.

(5) A printing management server according to embodiment 4 further characterized by comprising usable period setting means for setting the period of using the photosensitive material based on the input of temperature in the warehouse storing photosensitive materials.

According to the invention of embodiment (5), the same effect as that of embodiment (4) can be obtained. Not only that, usable period setting means allows the period of using the photosensitive material to be set based on the input of temperature in the warehouse storing the aforementioned photosensitive materials. This makes it possible to adjust the period of use in conformity to the storage environment.

(6) A printing management system comprising a printing management server for photosensitive material production control and printing management connected through a communications line to:

a customer terminal owned by a customer requesting an image data to be printed, a manufacturing department terminal owned by a photosensitive material manufacturing department and a printing department terminal owned by a printing department engaged in printing by using the photosensitive material manufactured by the manufacturing department, wherein the aforementioned printing management system is further characterized in that:

the aforementioned customer terminal comprises order data transmission means for sending a predetermined order data including image data to the aforementioned print management server;

the aforementioned print management server comprises: production control information creating means for creating production control information for the control of the volume and time of photosensitive material production, based on the order data received from the aforementioned data transmission means, production control information transmission means for transmitting to the aforementioned manufacturing department terminal, the production control information created by the aforementioned production control information creating means, and order data transmission means for transmitting to the aforementioned printing department terminal the order data received by the aforementioned receiving means;

the aforementioned manufacturing department terminal comprises production control information receiving means for receiving production control information sent from the aforementioned production control information transmission means; and the aforementioned printing department terminal comprises order data receiving means for receiving order data sent from the aforementioned order data transmission means.

The invention of embodiment (6) allows printing order, photosensitive material production control and printing management data to be exchanged via a communications line. This enables integrated management of all the processing related to printing, thereby allowing production of photosensitive materials in conformity to the amount of order accepted.

Thus, this embodiment ensures efficient production while minimizing performance deterioration of photosensitive materials, and provides high-quality printing at low prices at the same time.

(7) A printing management server according to embodiment 6 further characterized in that: the aforementioned print management server comprises:

printing management information creating means for creating printing management information for scheduled management of printing based on the aforementioned order data, and printing management information transmission means for sending to the aforementioned printing department terminal the printing management information created by the aforementioned printing management information creating means; and the aforementioned printing department terminal comprises printing management information receiving means for receiving printing management information sent from the aforementioned printing management information transmission means.

According to the invention of embodiment (7), the same effect as that of embodiment (6) can be obtained. Not only that, printing is placed under scheduled management based on printing management information, whereby efficient printing is ensured.

(8) A printing method based on the advantages of the printing management system according to embodiment (6) or (7) characterized in that:

the aforementioned print management server uses the aforementioned production control information creating means to set the optimum inventory volume to ensure that the photosensitive materials can be used up within a predetermined period of use, and creates production control information for adjusting the volume and period of production in such a way that the aforementioned photosensitive material storage volume memorized in the aforementioned storage volume memory means is kept at the aforementioned optimum level;

the aforementioned manufacturing department produces the aforementioned photosensitive material based on the production control information received by the aforementioned production control information receiving means; and the aforementioned printing department performs printing work based on the order data received from the aforementioned order data receiving means.

According to the invention of embodiment (8), printing order, photosensitive material production control and printing management are performed in an integrated manner whereby photosensitive materials are produced in conformity to the amount of order accepted. This permits production adjustment to be made in conformity to the photosensitive material storage and secular performance deterioration in the manufacturing department. Further, use of a management server permits a great many orders to be received. Photosensitive materials produced in conformity to the received orders are used for printing in the printing department, and the photosensitive material manufacturing department and printing department can be installed close to each other, thereby cutting down transportation costs and reducing the amount of lightproof package.

(9) A printing method according to the embodiment (8) further characterized in that printing is carried out based on printing management information sent from the aforementioned printing management information receiving means.

According to the invention of embodiment (9), the same effect as that of embodiment (8) can be obtained. Not only that, the printing department allows printing to be performed based on printing management information, whereby more effective printing is ensured.

As discussed above, in the present invention, the light sensitive material manufacturing process, the exposing process and the developing process are administrated so as to provide a print having a stable quality. As a result, it make it possible to omit additional designs and techniques used to guarantee a quality against various kinds of aging conditions for the light sensitive material in the conventional situations in the markets and against variations in the exposing and developing conditions in each mini-lab and each large-scaled lab. For example, in the mini-lab in which the administration for the machine is not conducted so good, the developing process condition may be less active and there may be a trend that the image density of prints is lowered. In order to guarantee a quality against the bad administration, an amount of coating solutions to form emulsion layers on the light sensitive material includes some margin. However, according to the present invention, since the margin is not required, the amount of coating solutions can be reduced. Also, the technique used to refrain the aging deterioration of the light sensitive material such as an additive of fog refraining agent can be omitted.

As a result, according to the present invention, it make it possible to reduce cost of the light sensitive material.

BRIEF DESCRIPTION OF THE DRAWINGS

FIG. 11 is a schematic diagram representing the physical distribution and procedure thereof according to a prior art printing method.

DETAILED DESCRIPTION OF THE PREFERRED EMBODIMENT

Figure 1:
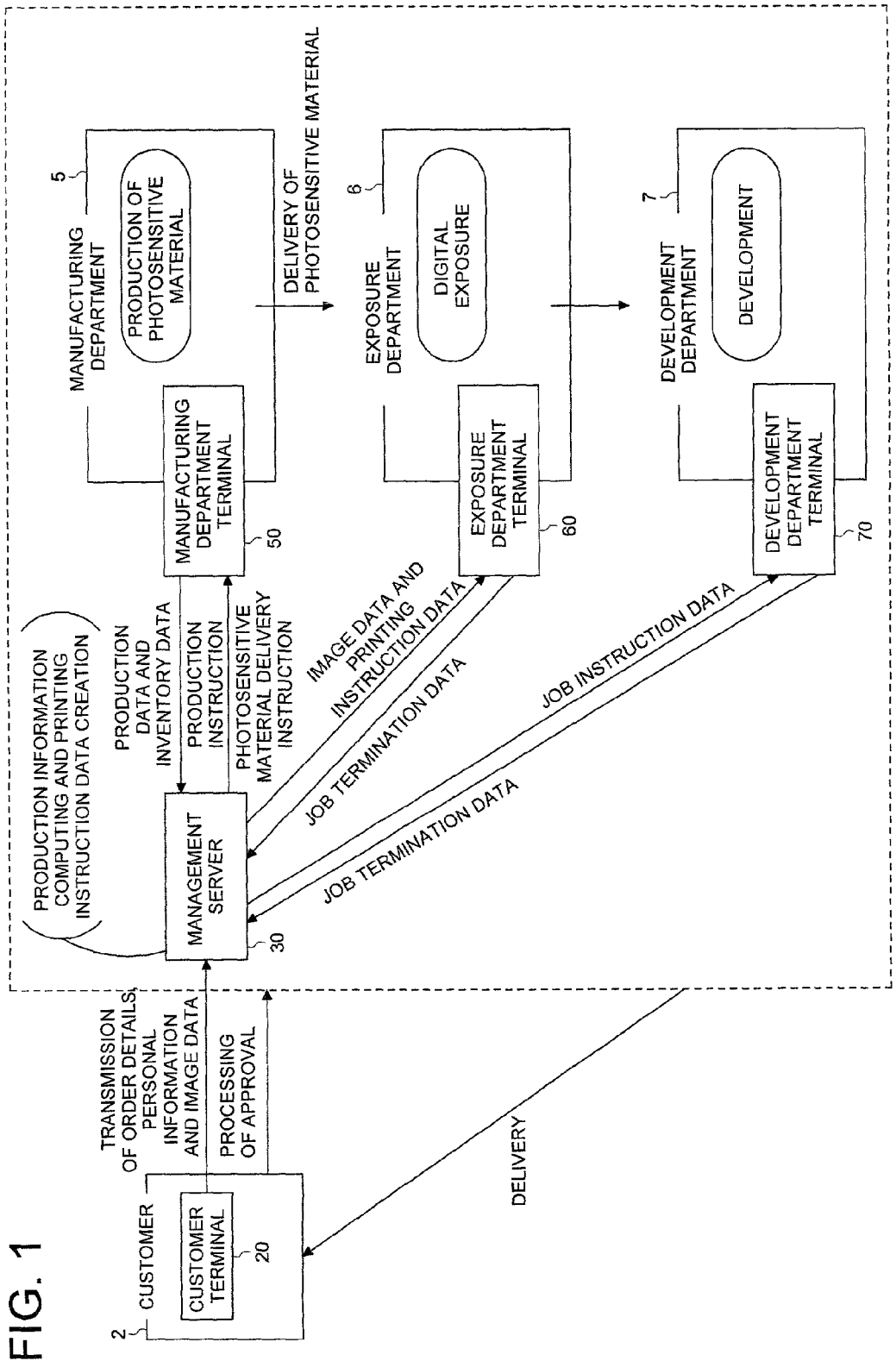
FIG. 1 is a block diagram representing the general system configuration of a printing management system according to the present invention.
Figure 2:
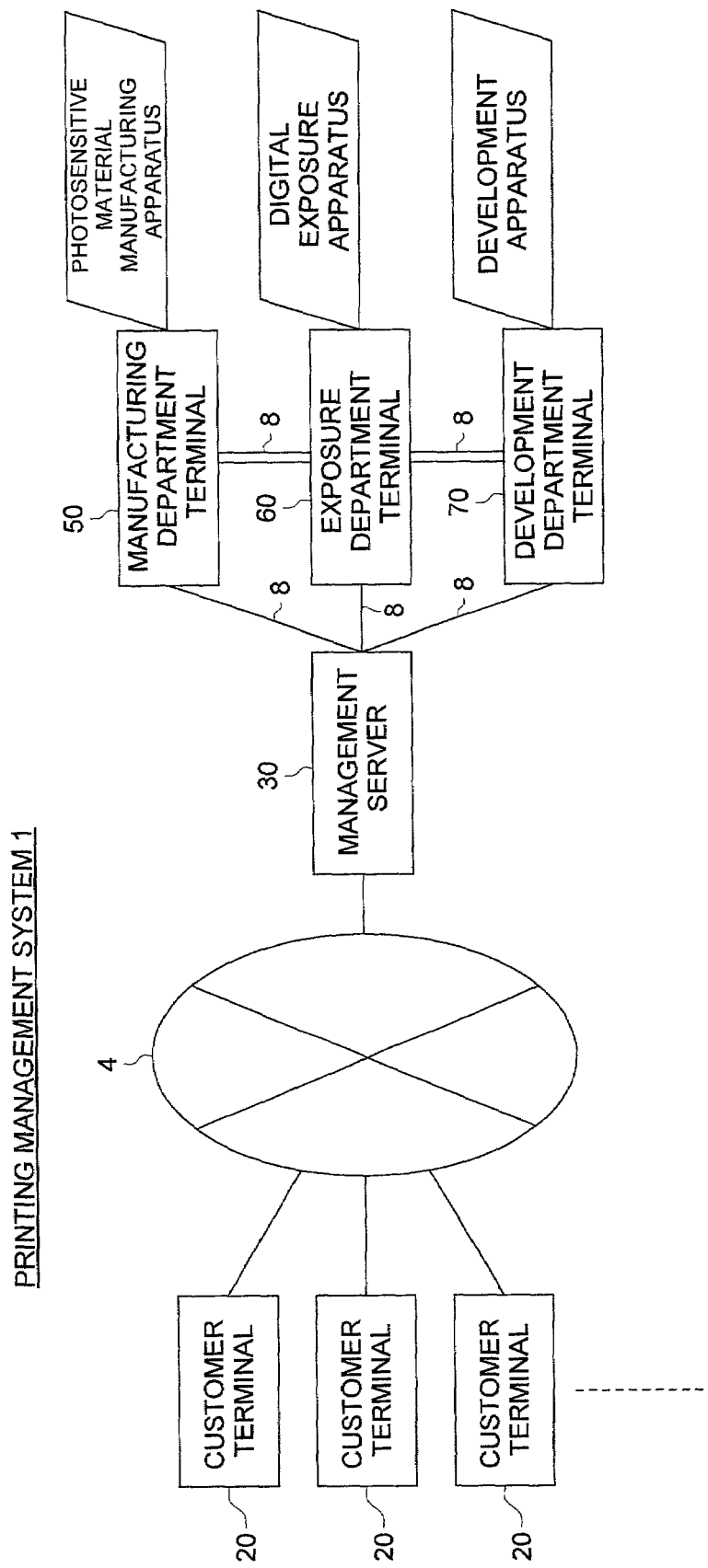
FIG. 2 is a block diagram representing the system configuration regarding connection between terminal equipment and server of a printing management system 1 of FIG. 1.

The following describes the embodiments of this invention with reference to drawings:

The configuration will be described first: As shown in FIGS. 1 and 2, in the printing management system according to the present invention, a customer terminal 20 owned by a customer 2 requesting for printing through image data is connected with a management server (print management server) 30 for receiving the printing order data including the image data from a customer terminal 20 via the open communications network 4 of the Internet or the like. Further, this management server 30 is connected via the LAN (communications line) 8 with a manufacturing department terminal 50 owned by a manufacturing department 5 for manufacturing photosensitive materials, a exposure department terminal (printing department terminal) 60 owned by a exposure department (printing department) 6 for providing treatment of digital exposure to this photosensitive material, and a development department terminal (printing department terminal) 70 owned by a development department (printing department) 7 engaged in development work. The management server 30 provides integrated management of all steps ranging from the step of producing the photosensitive material at the photosensitive material manufacturing department 5 to the step of print the ordered image data at exposure department 6 and development department 7, based on the instructions of the order. The manufacturing department 5, exposure department 6 and development department 7 are located in one and the same site, for example.

Figure 3:
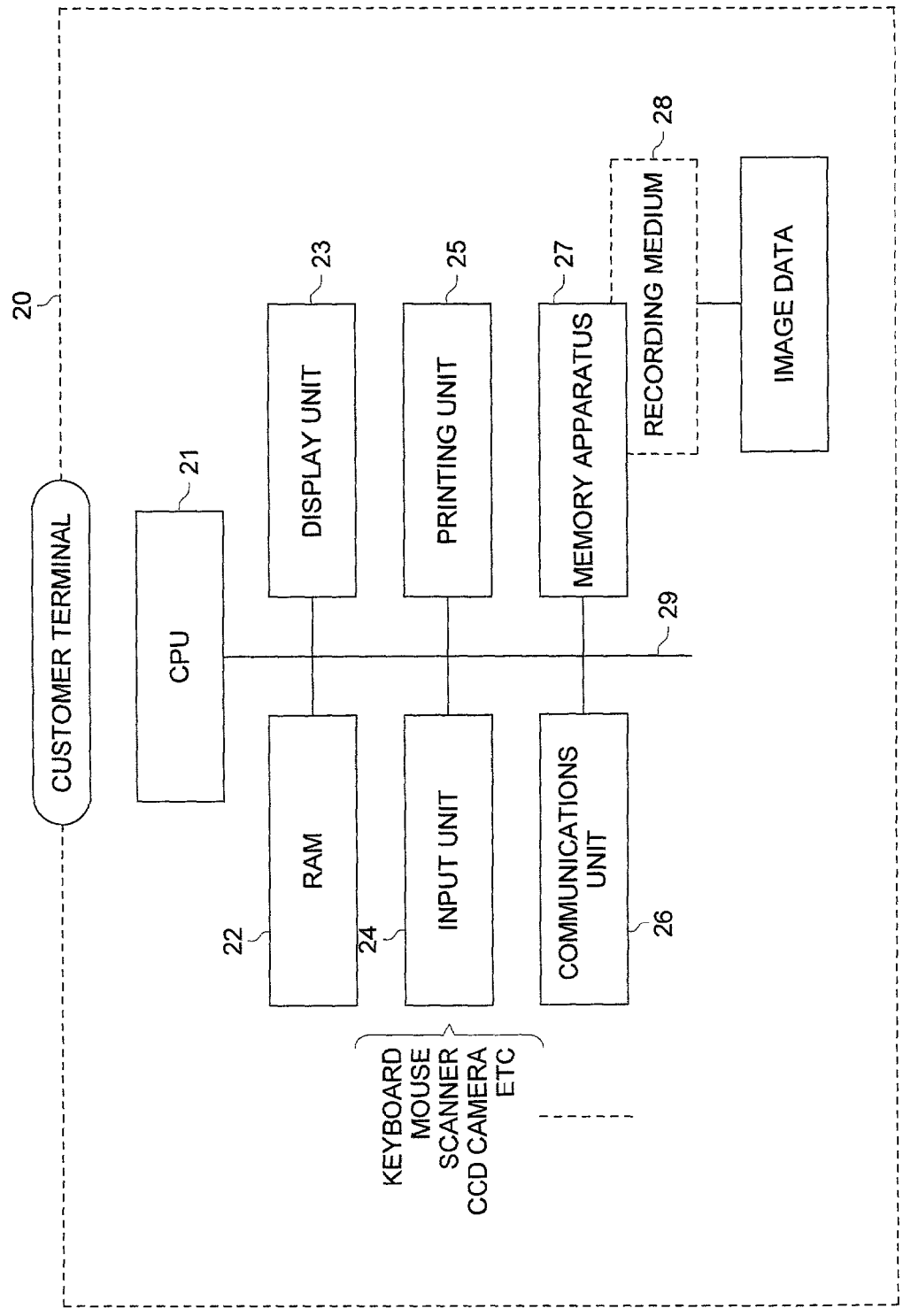
FIG. 3 is a block diagram representing the internal configuration of a customer terminal 2 shown in FIG. 2.

The customer terminal 20 cooperates with the management server 30 to process the order for printing and to send image data to the management server. For example, it comprises, for example, a general-purpose personal computer. As shown in FIG. 3, it is provided with a CPU21, a PAM22, a display unit 23, an input unit 24, a printing unit 25, a communications unit 26, a memory apparatus 27, a recording medium 28, etc. These units except for the recording medium 28 are connected by a path 29. As shown in FIG. 2, multiple customer terminals 20 are present on the network. Further, the customer terminal 20 can be a mobile communications terminal provided with a pickup apparatus, communications apparatus, etc., for example, PDA, cellular phone and digital camera.

The CPU21 reads out the program and data stored in the recording medium 28, stores the data into the RAM22 on the temporary basis, and take charge of control of each unit, data transfer and various computations. Further, it serves as order data transmitting means to send printing order data including image data to the management server 30.

In various types of processing executed by CPU21, the RAM22 constitutes a memory area where a program and data are stored on the temporary basis, and the work area where processing is performed according to input instructions and input data.

The display unit 23 is composed of the CRT, LCD, etc., for example, and displays various display data and images entered from the CPU21. To put it more specifically, it displays a printing order screen sent from the management server 30, for example.

The input unit 24 comprises a mouse and keyboard, for example, and instruction information displayed on the screen of the display unit 23 can be selected and designated or a desired instruction information, etc. can be entered. Further, it can be provided with a CDD camera for picking up image data to be printed, a scanner or like for picking up images.

The printing unit 25 prints the print data (e.g. print ordering screen) output from the CPU21, for example.

The communications unit 26 comprises a modem and terminal adapter or router, and controls communications with external equipment via the communications line such as telephone line, ISDN line or leased line.

Programs and data are memorized in advance in the memory apparatus 27. This memory apparatus 27 includes the recording medium 28 which can be read by CPU21, such as a magnetic or optical recording medium or semiconductor memory. This recording medium 28 includes a portable medium such as a CD-ROM and memory card, a fixed medium such as hard disk. It is also possible to arrange a configuration where part or all of the programs, data, etc. stored in this recording medium 28 are received from the communications unit 26 through other servers and client via the network such as WAN and LAN. Further, the recording medium 28 may be a recording medium of the server or client configured on the network.

To put it more specifically, the recording medium 28 stores the application and other programs of the WWW browser or the like to realize the functions of processing the printing order in the present embodiment. In particular, it stores image data on printing request.

Figure 4:
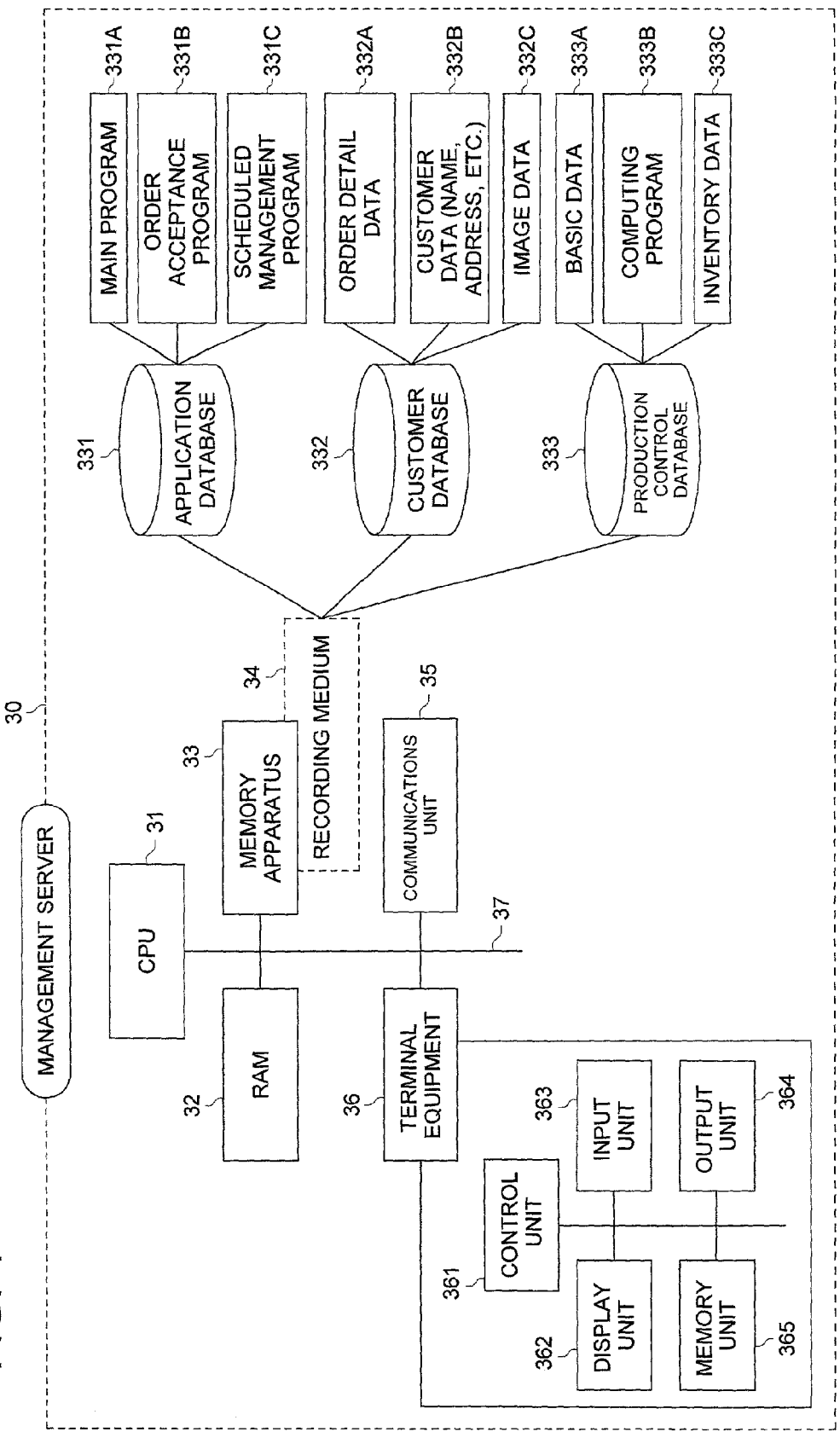
FIG. 4 is a block diagram representing the internal configuration of a management server 30 shown in FIG. 2.

The management server (print management server) 30 functions as a WWW server to exchange printing order data with the customer terminal 20 via communications network 4 such as the Internet. At the same time, this server exchanges data in photosensitive material production control with the manufacturing department terminal 50 connected via the LAN 8, and exchanges data on printing with the exposure department terminal 60 and development department terminal 70 also connected via the LAN 8. As shown in FIG. 4, it incorporates a CPU31, RAM32, memory apparatus 33, recording medium 34, communications unit 35 and terminal apparatus 36, and all units except for the recording medium 34 are connected by the path 37.

The CPU31 reads out the program and data stored in the memory apparatus 33, stores the data into the RAM22 on the temporary basis, and take charge of control of each unit, data transfer and various computations.

To put it more specifically, the CPU31 serves as receiving means for controlling receipt of order data from the customer terminal 20, and functions as production control information creating means for controlling computation on photosensitive material production control based on the order detail data sent from the customer terminal 20. It also serves as production control information transmission means for controlling transmission of production control information to the manufacturing department terminal 50.

Further, the CPU31 serves as order data transmission means for controlling transmission of the order data sent from the customer terminal 20 to the exposure department terminal 60 and development department terminal 70. Further, it functions as printing management information creating means to control creation of printing management information for scheduled management of printing work based on the order detail data and image data sent from the customer terminal 20. It also works as printing management information transmission means to control transmission and reception the scheduled management information for printing including the customer order details data and image data from/to the exposure department terminal 60 and development department terminal 70.

Further, it functions as optimum inventory volume setting means to control the process of setting the optimum inventory volume of photosensitive materials which can be used up within a predetermined period of use, based on the order data sent from the customer terminal 20. It also work as usable period setting means for setting the period of using the photosensitive material based on the temperature data in the warehouse storing photosensitive materials.

In the processing carried out by the CPU31, the RAM32 constitutes a memory area where a program and data are stored on the temporary basis, and the work area where processing is performed according to input instructions and input data.

The memory apparatus 33 stores the program and data. This memory apparatus 33 includes the recording medium 34 which can be read by CPU31, such as a magnetic or optical recording medium or semiconductor memory. This recording medium 34 includes a portable medium such as a CD-ROM and memory card, a fixed medium such as hard disk. It is also possible to arrange a configuration where part or all of the programs, data, etc. stored in this recording medium 33 are received from the communications unit 35 through other servers and the like via the network such as WAN and LAN. Further, the recording medium 34 may be a recording medium of an external server or terminal configured on the network.

The memory apparatus 33 stores system programs required for the prevent invention, various packages of application software such as for CAD and image processing, various programs for operations programmed for the present invention, various databases and data processed by the processing program.

To put it more specifically, the aforementioned various databases stored in the memory apparatus 33 include application database 331, customer database 332, production control database 333, etc.

The application database 331 contains various packages of application software, programs and data the operation of the prevent invention. For example, it contains the Web screen data (not illustrated) necessary for processing of the printing order, WWW-related system program, main program 331A, order acceptance program 331B, scheduled management program 331C, etc.

The order acceptance program 331B is a program for processing of printing order acceptance. It presents to the customer terminal 20 the data on prices determined in conformity to various sizes of the prints for which order can be accepted, and data on delivery time, and carries out computations based on the data sent from the customer terminal 20, thereby accepting printing orders.

The scheduled management program 331C contains the order details, text data and image data required for printing performed in the exposure department 6 and developing department 7 based on the printing order placed by the customer 2. It is a program for instructing the management server 30 to implement creation of printing management information for scheduled management of printing, and transmission and reception of various data on the aforementioned printing to/from the exposure department terminal 60 and development department terminal 70.

The customer database 332 stores the data on printing orders sent from the customer terminal 20. To put it more specifically, the order detail data 332A, customer data 332B and image data 332C are stored in it. These three data items are associated with one another and are stored.

The order detail data 332A includes the following data out of the order data sent from the customer terminal 20; data on the number of prints, and size and type of the print (quality on printed surface such as luster, silk and mat, as well as thickness), custom order data (color compensation, trimming, superimposition of images and letters, enlargement, reduction, etc.) for image data, delivery of finished prints, etc.

The customer data 332B includes the data on customer's private information such as a name and contact point (address, phone number, e-mail address, etc.), and data on the delivery of finished print and means for payment. When settlement of accounts are to be made using a credit card, the data on card number is also included in the data on means for payment.

The image data 332C is the data photographed by the customer 2 with a digital camera or the like, and is the image data conforming to a predetermined method such as CDF.

The production control database 333 is a database storing various types of data and programs for managing the production of photosensitive materials in conformity to the volume and contents of printing work ordered by the customer 2. To put it more specifically, it stores basic data 333A and computing program 333B for computing the photosensitive material production volume and production period in conformity to the volume of order received, as well as inventory data 333C for each type of photosensitive material. This inventory data 333C contains the product data of photosensitive material as well as date of manufacture, period of use and other information. The basic data 333A of the production control database 333 contains past order data and production data for implementation of estimated production, for example, data on the period of use and others regarding the photosensitive material according to category or season.

Comprising a modem, terminal or router, the communications unit 35 controls communications with external equipment via the communications line such as telephone line, ISDN line or leased line.

The terminal apparatus 36 is used for maintenance in various types of processing in the management server 30. To put it more specifically, it is used by the manager of the management server to input or updating of information of various databases such as memory apparatus 33 and to create mails to be sent to the manufacturing department terminal 50 or the like. The terminal apparatus 36 comprises a control unit 361, a display unit 362, an input unit 363, an output unit 364, a memory unit 365, etc., as shown in FIG. 2.

The control unit 361 contains a CPU, RAM and others (not illustrated) and provides various operation controls based on the operation instruction input from the input unit 363, using the program or data stored in the memory unit 365.

The display unit 362 comprises a CRT, LCD and others, and indicates various types of data on the screen according to the display control provided by the control unit 361.

The input unit 363 has a mouse and keyboard, and is used to enter control signals and others into the control unit 361.

The output unit 364 has a printer, and is used to print out the information on order placement and reception stored in the customer database 332.

The memory unit 365 stores various types of program and data to be executed by the control unit 361.

Figure 5:
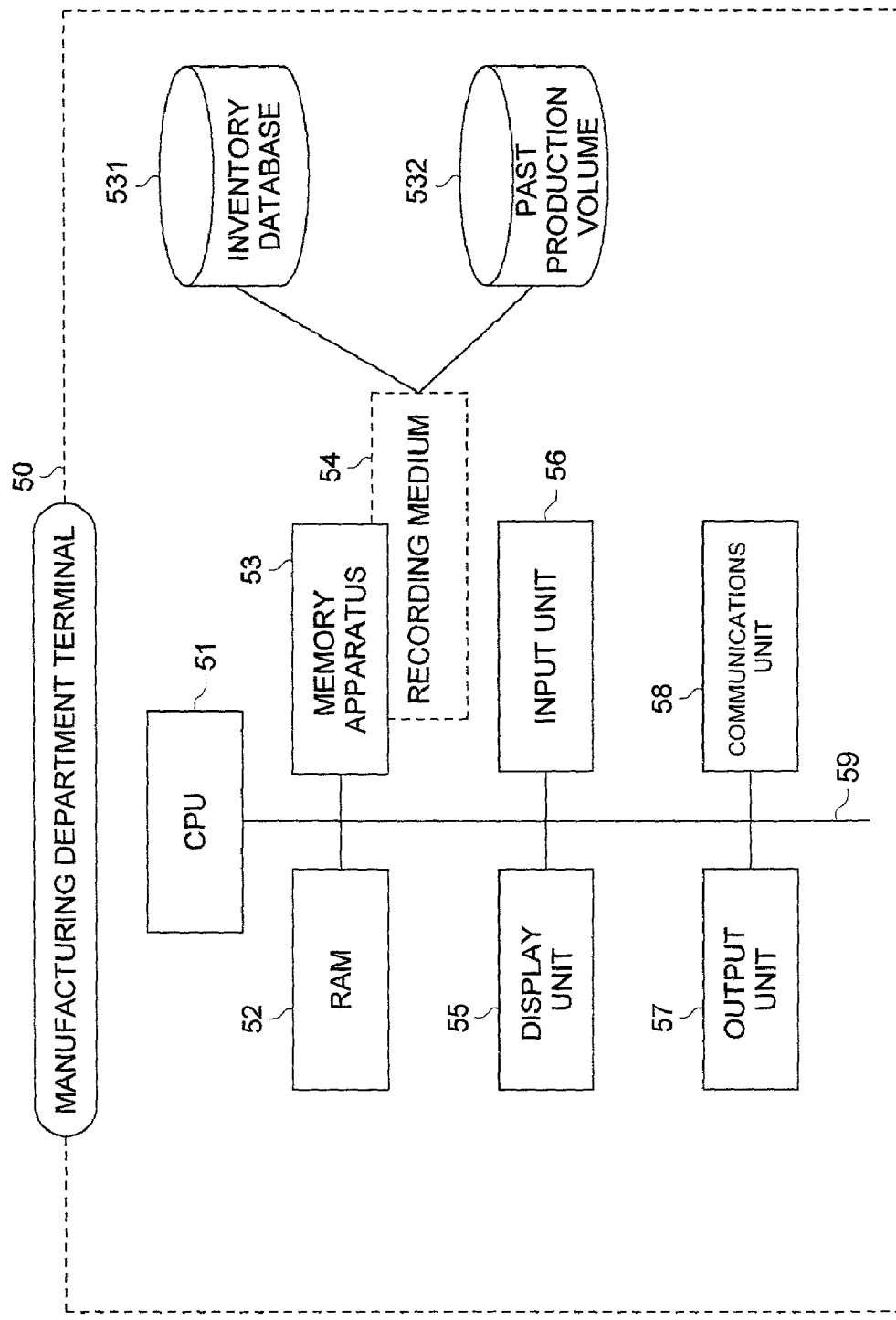
FIG. 5 is a block diagram representing the internal configuration of a manufacturing department terminal 50 shown in FIG. 2.

The manufacturing department terminal 50 is a terminal apparatus installed at the manufacturing department 5 which manufactures photosensitive materials. It receives instruction data on photosensitive material production from the management server 30, and sends data on photosensitive material production status and inventory status to the management server 30. As shown in FIG. 5, it incorporates a CPU51 (production control information receiving means), a RAMS2, a memory apparatus 53, a recording medium 54, a display unit 55, an input unit 56, an output unit 57, a communications unit 58, etc. These units except for the recording medium 54 are connected by a path 59. Functions of each unit are much the same as those of the management server 30. To avoid duplication, their detailed description will be omitted. Only different units will be described.

Especially, the recording medium 54 provided on the memory apparatus 53 of the manufacturing department terminal 50 has an inventory database 531 storing inventory data for each type of photosensitive materials and a past production database S32 storing the past production data. The inventory data stored in the inventory database 531 contains the product data of photosensitive material as well as date of manufacture, period of use and other information.

Figure 6:
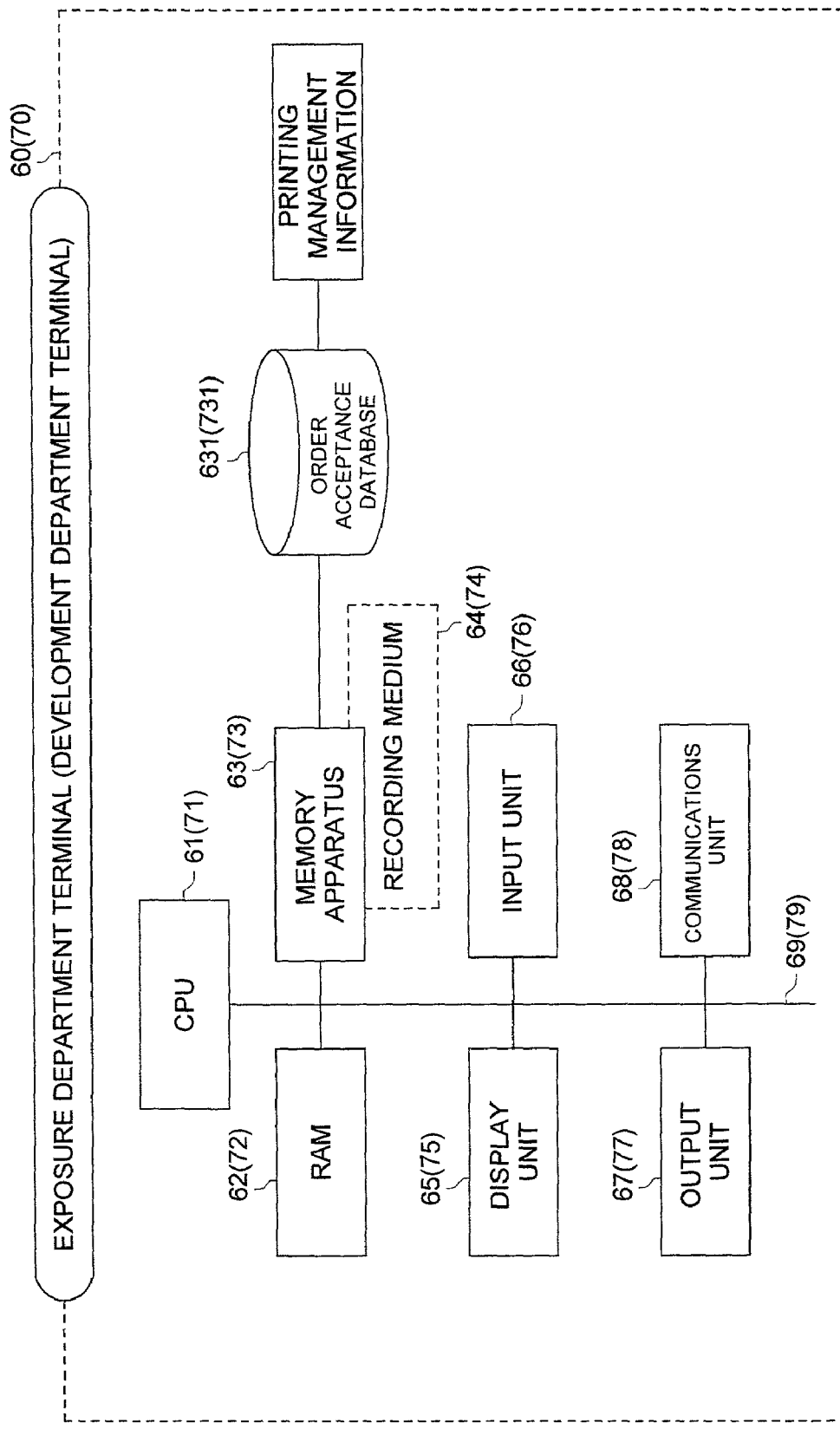
FIG. 6 is a block diagram representing the internal configuration of an exposure department terminal 60 and development department terminal 70 shown in FIG. 2.

The exposure department terminal 60 has an exposure department 6 for digital exposure of image data onto the photosensitive material produced in the manufacturing department 5. It is used to receive the printing management information including image data ordered through the management server 30 and order detail data, and to send work status data to the management server 30. The exposure department terminal 60 contains a CPU61 (order data receiving means, printing management information receiving means), RAM62, memory apparatus 63, recording medium 64, display unit 65, input unit 66 and output unit 67, as shown in FIG. 6. All units except for the recording medium 64 are connected by the path 69.

Functions of each unit are much the same as those of the management server 30. To avoid duplication, their detailed description will be omitted. The recording medium 60 has an order acceptance database 631 for storing the printing management information including the image data and order detail data sent from the management server 30. It also contains an image-processing program (not illustrated) for digital processing the image data of the customer 2.

Figure 7:
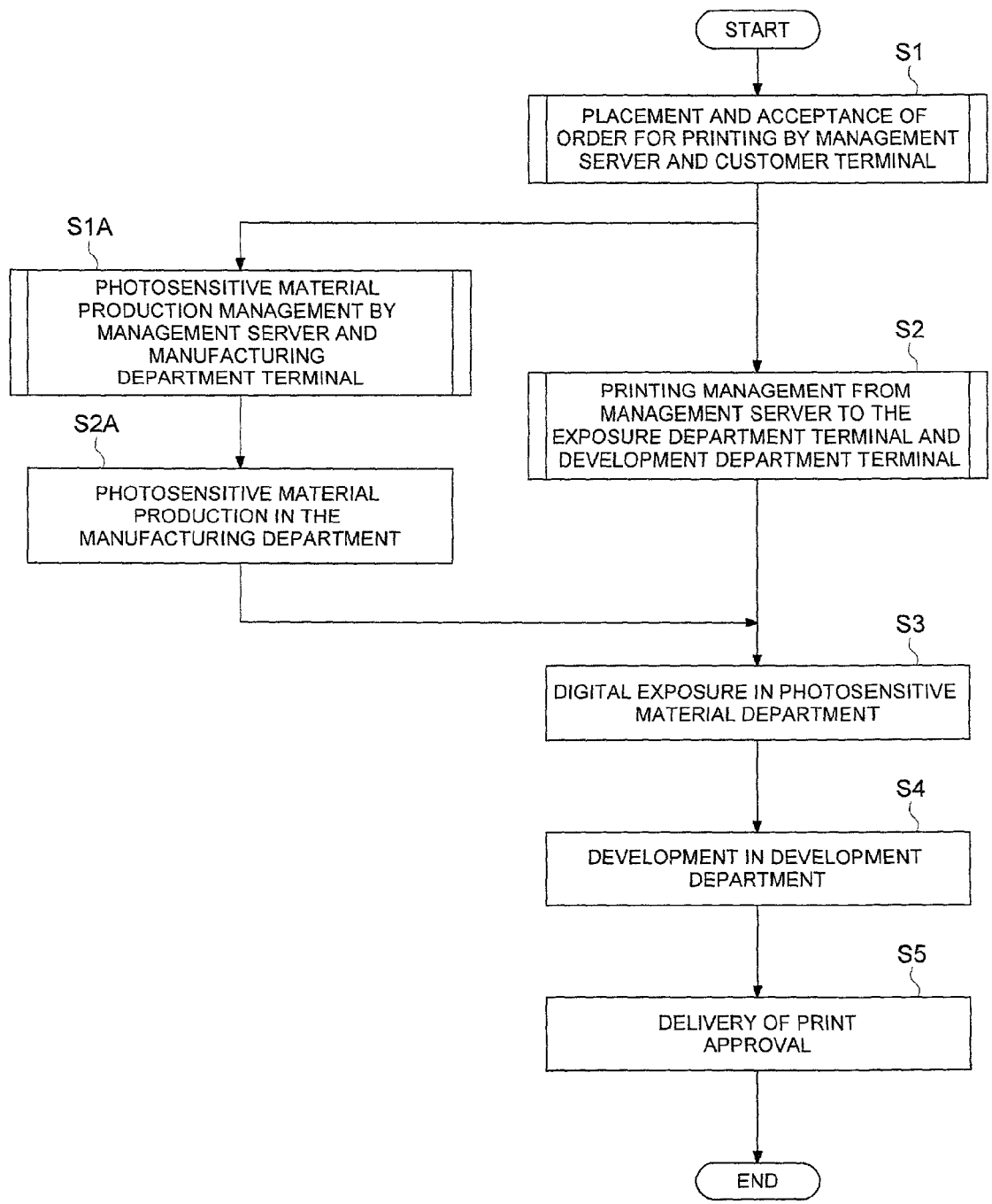
FIG. 7 is a flow chart representing the overall operation of a printing management system according to the present invention.

The development department terminal 70 is installed in the development department 7 for developing digitally exposed photosensitive materials. It is used to receive the printing management information including the order detail data for the order placed through the management server 30, and to send the work status data to the management server 30. As shown in FIG. 7, the development department terminal 70 contains a CPU71 (order data receiving means, printing management information receiving means), RAM72, memory apparatus 73, recording medium 74, communications unit 75 and terminal apparatus 76. All units except for the recording medium 74 are connected by the path 77. Functions of each unit are the same as those of the management server 30, manufacturing department terminal 50 and exposure department. To avoid duplication, their detailed description will be omitted. The recording medium 74 has an order acceptance database 731 for storing the printing management information including the order detail data sent from the management server 30.

The following describes the operation of the printing management system 1 of the present invention arranged in the aforementioned configuration with reference to the block diagram in FIG. 1 and flow chart in FIG. 1:

The overall operation flow the printing management system 1 of the present invention will be described first with reference to the flow chart of Chart 7:

Printing order placement and reception processing is carry out between the customer terminal 20 operated by customer 2 and management server 30 (Step S1).

Data transmission and reception is processed via LAN 8 regarding the management of printing among the management server 30, exposure department terminal 60 and development department terminal 70 based on the printing order placement and reception in Step S1. (Step S2)

Digital exposure processing is carried out to provide digital exposure on the photosensitive material delivered by the manufacturing department in the exposure department 6 having received via the exposure department terminal 60 the data on the management of printing processing including the image data of the customer 2 in the aforementioned Step S2 (Step S3).

The aforementioned digitally exposed photosensitive material is then sent to the development department 7, and is subjected to development based on the printing management data received by the management server 30 via the development department terminal 70 (Step S4).

Upon completion of printing, the completed print is handed over to the customer 2 and settlement of accounts is processed for printing charges. All the operations in the printing system according to the present invention are now complete (Step S5).

When the completed print is handed over to the customer, it can be mailed to the address specified by the customer 2, or can be handed over to the customer at a convenience store nearest to the customer, a department store, a super-market, a kiosk at the station, a bookstore or an agent such as a camera shop. Printing charges are paid according to the method for settlement of accounts selected by the customer 2 in the processing of order acceptance in Step S1; for example, by receiving the product in return for payments, transfer of money to a specified account, subtraction of the amount from the customer's bank account, settlement of credit card accounts via the Internet or settlement by electronic money.

Further, the management server 30 processes printing order acceptance in the Step S1 with a plurality of customer terminals 20, etc., and computes the photosensitive material production volume and time period thereof in conformity to the details of the order such as the volume of order.

It also works with the manufacturing department terminal 50 to process photosensitive material production control to issue the instructions on photosensitive material production and delivery to the manufacturing department 5 (Step S1A).

The manufacturing department 5 produces the photosensitive material based on the production and delivery instruction coming from the management server 30 via the manufacturing department terminal 50, and delivers the product to the exposure department 6 (Step S2A).

Figure 8:
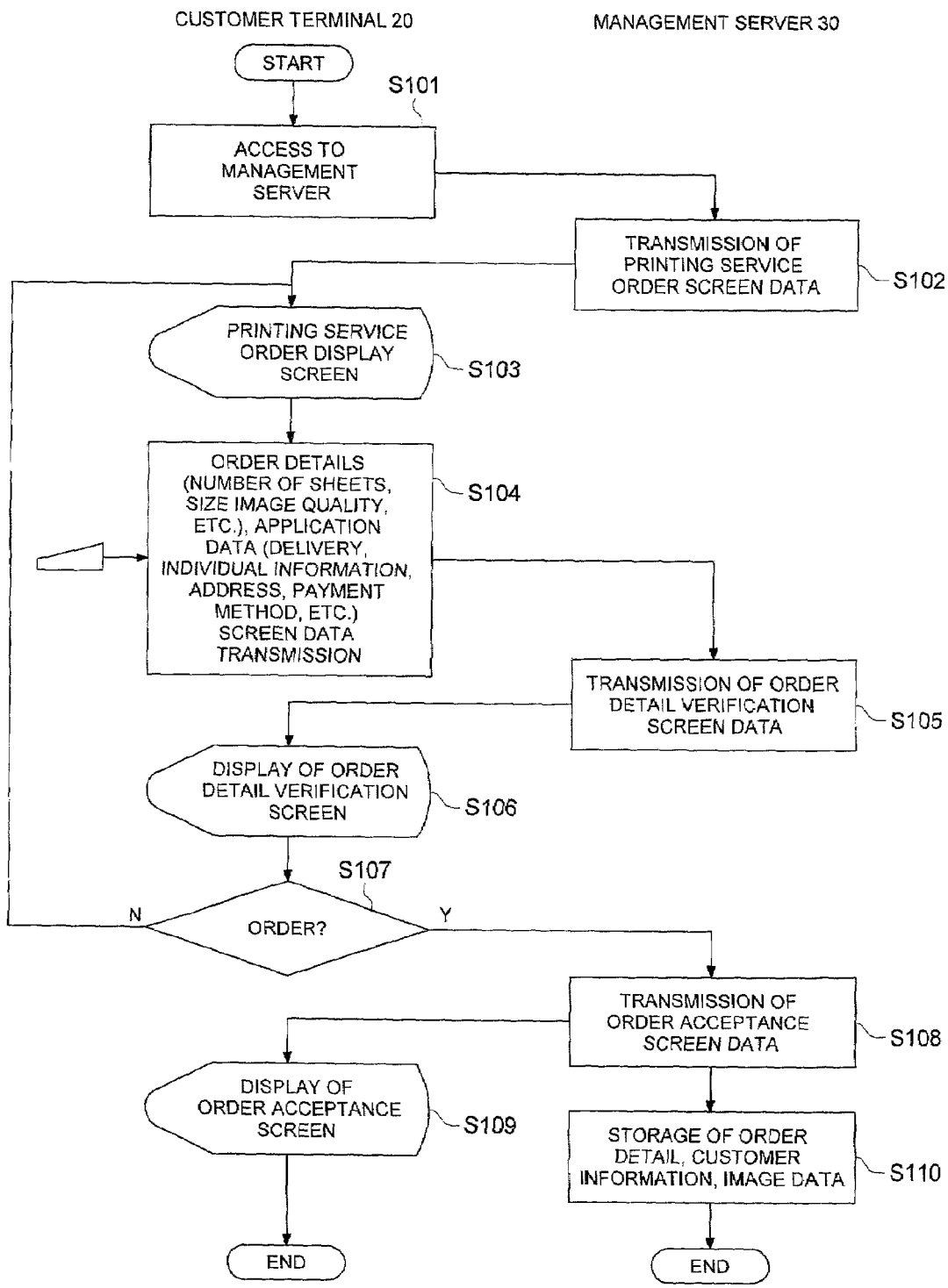
FIG. 8 is a flow chart representing the detailed operations of printing order placement and acceptance processing in step S1 of FIG. 7.

The following gives the details of the aforementioned description:

First, printing order placement and reception processed between the customer terminal 20 and management server 30 in Step S1 will be described with reference to the flow chart in FIG. 8.

The customer 2 as an operator of the customer terminal 20 accesses such an open communications network 4 as the Internet, and uses the input unit 24 or the like to enter a predetermined URL. Taking such a similar step, the aforementioned customer accesses the management server 30, and requests the management server 30 to provide the order screen data of printing order service (Step S101).

Having received the request signal for the order screen data of printing order service via the communications unit 35, the CPU31 of the management server 30 causes the order acceptance program 331B stored in the application database 331 to be stored into the RAM32 so that this program starts up. Then control of the following operations is started in conformity to the program 331B. The CPU31 sends the print service order screen data stored in the application database 331 to the customer terminal 20 via the communications unit 35 (Step S102).

Then the customer terminal 20 receives the aforementioned order screen data via the communications unit 26, and the CPU21 of the customer terminal 20 causes this order screen data to be displayed on the display unit 23 (Step S103).

Here items to be selected and specified by the customer 2 on the aforementioned screen include the number of prints, print size, quality on printed surface such as luster and silk, as well as type of prints such as thickness. For example, custom order data on image data color compensation, trimming, superimposition of images and letters, enlargement, reduction, etc. can be ordered by the customer 2 if desired.

This order screen includes the items to be specified, including the customer's name, contact point, e-mail address, delivery method, time of delivery and means for payment. The delivery method is defined as a method for handing the finished prints over to the customer. For example, any of the following positions can be selected for handing the finished prints over to the customer; a convenience store, a super-market, a department store, a bookstore, a kiosk at the station or an agent such as a camera shop. The account settlement method can be selected from the following, for example; by receiving the product in return for payments, transfer of money to a specified account, subtraction of the amount from the customer's bank account, settlement of credit card accounts via the Internet or settlement by electronic money.

Under this condition, customer 2 uses the input unit 24 to select or enter these items, and attach the image data to be printed. When the customer 2 has clicked on the button or the like, the CPU21 of the customer terminal 20 sends the order data including the application data and attached image data to the management server 30 (Step S104).

Having received the aforementioned application data, the CPU31 of management server 30 creates an order detail verification screen data and sends it to the customer terminal 20 (Step S105).

Then an order detail verification screen (not illustrated) for verification of order detail data and application data appears on the display unit 23 of the customer terminal 20 (Step S106). So the customer 2 uses an input unit 24 to select an order button or cancel button. When it has detected a signal indicating that the order button has been pressed (Step S107: Yes), the CPU21 sends an order signal to the management server 30 and proceeds to Step S108. When it has detected a signal indicating that the cancel button has been pressed (Step S107: No), the CPU21 proceeds to Step S103.

In Step S108, the CPU31 of the management server 30 receives the order signal sent from the customer terminal 20 and creates an order acceptance screen data. It then sends it to the customer terminal 20 and process to Step S110.

Then the CPU21 of the terminal 20 causes the order acceptance screen received from the management server 30 to be displayed on the display unit 23 (Step S109).

In the meantime, customer information such as order detail data and application data, and image data having received from the customer terminal 20 are loaded into the customer database 332 in Step S110 by the CPU31 of the management server 30. Processing of printing order placement and reception is not complete (Step S1).

In the aforementioned processing of printing order placement and reception, it is also possible to arrange a configuration which permits simulation of superimposition wherein letters and other images are superimposed on the image data by the operation of the customer terminal 20. In this case, the management server 30 is provided with a system which can be started on the WWW and which is capable of image processing with the customer terminal 20.

Figure 9:
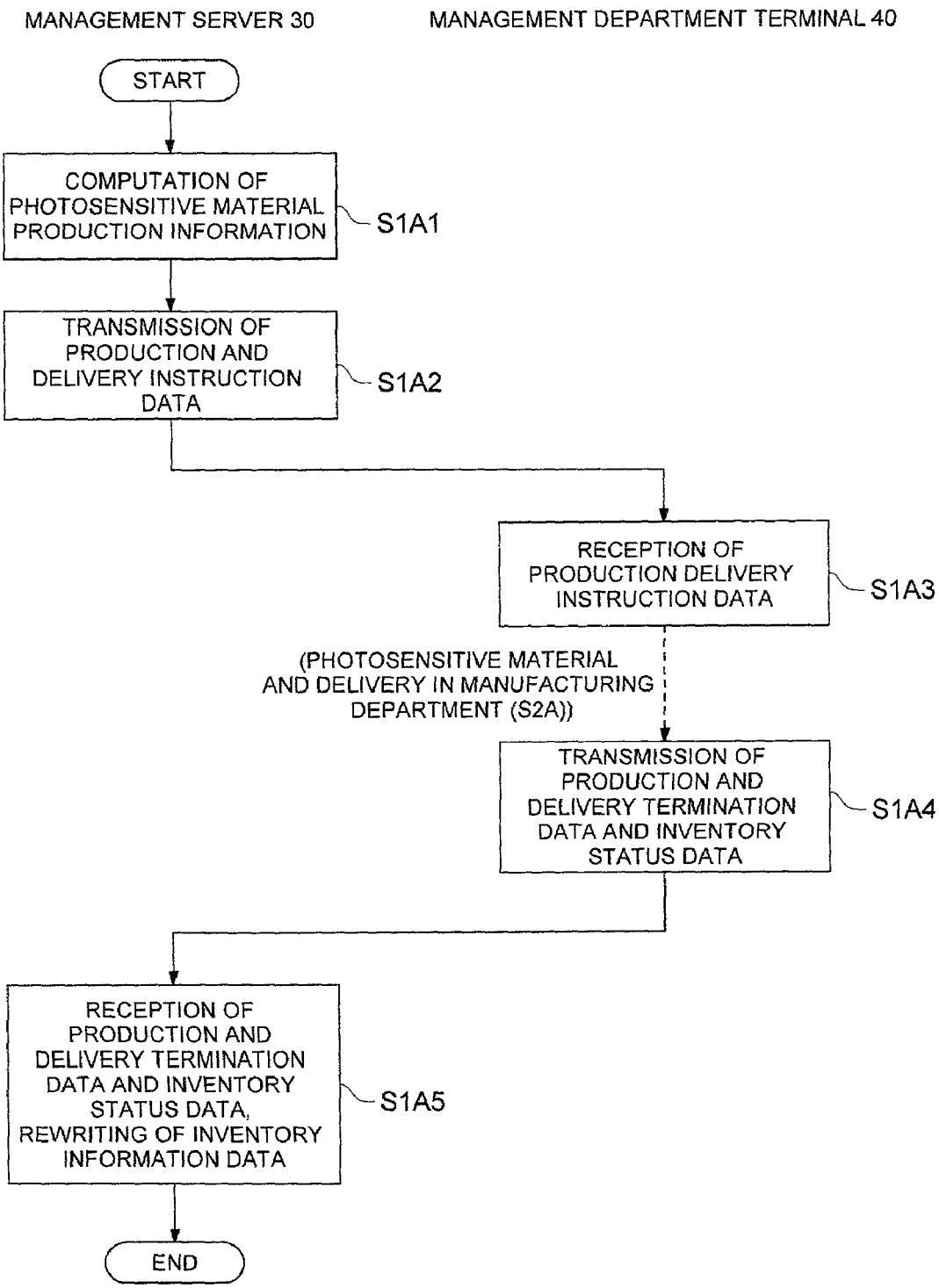
FIG. 9 is a flow chart representing the detailed operations of production control processing in step S1A of FIG. 7.

With reference to the flow chart of FIG. 9, the following describes processing of photosensitive material production control (Step S1A) to be implemented between the management server 30 and manufacturing department terminal 50 in response to printing order placement and reception in the aforementioned Step S1:

Having received printing order from the customer terminal 20 in Step S1, the CPU31 of the management server 30 reads out a computing program 333B stored in the production control database 333, and loads it into the RAM32 where it is started to computer then production control information on photosensitive material production volume, production time period, etc. in conformity to this program (Step S1A1).

To put it more specifically, computing of production control information is that the data on the volume of printing and delivery time requested by the customer 2 is compared with the inventory volume of photosensitive materials, and the optimum inventory is computed based on the given basic data including the data on the period of use of photosensitive materials without performances being deteriorated. Then computation is made to find out the production volume of photosensitive materials that can be used up within the period of use of photosensitive materials, and time of production in such a way that this optimum inventory level is reached. To put it in greater details, computation is made using the basic data such as the parameter on the trend of photosensitive materials to be consumed as predetermined in conformity to the data on past order volumes, or the parameter on the permissible period of use dependent on changes in performance based on such storage conditions as temperature and humidity of photosensitive materials. The data on such storage conditions as temperature and humidity of photosensitive materials is measured by a thermometer and hygrometer in the warehouse where photosensitive materials are stored. The measured storage conditions are sent to the management server 30 via the manufacturing department terminal 50. Then the CPU31 of the management server 30 sets up the period of use according to the received data on storage conditions.

In this case, the CPU31 creates the production control information including the production volume and production time period, and the instruction on the delivery to the exposure department 5 for each category of the photosensitive material.

Then the photosensitive material production control information and the instruction on the delivery created according to the aforementioned computation sent to the manufacturing department terminal 50 via the communications unit 35 by the CPU31 of the management server 30 (Step S1A2).

Then the manufacturing department terminal 50 receives the aforementioned photosensitive material production control information and the instruction on the delivery (Step S1A3). The operation in Step SA1 of FIG. 7 terminates with reception of this information. It is also possible to arrange an configuration where transmission and reception of production and delivery information between this management server 30 and manufacturing management department terminal 50 are processed for each order from the customer terminal 20 or at each of the predetermined separated periods.

Photosensitive material production is processed according to the photosensitive material production control information and delivery instruction information received from the management server 30 via the manufacturing department terminal 20 in the aforementioned manufacturing department 5 (Step S2A).

This photosensitive material production process is the same as the photosensitive material production process commonly adopted in the industry. To put it more specifically, the silver halide photosensitive material represented by color paper and color film is manufactured is manufactured as follows: Preparation is made of photosensitive silver halide emulsion produced by growth of silver halide particles into crystals chemical sensitization and pigmentary sensitization, a pigment forming coupler, a solvent with high boiling point (if required), a pigment image stabilizer, an ultraviolet ray absorbing agent, a fogging inhibitor, a dispersant comprising such a lipophilic composition as pigment absorption improving agent, hydrophilic colloid represented by gelatin as a binder, surfactant, liquid viscosity regulator, irradiation inhibiting dye, silver development inhibitor, fluorescent whitening agent, membrane physical property improver and a plurality of coating liquid compositions containing an additive such as hardening agent as required. A slide hopper method or curtain coating method is used to carry out simultaneous coating on multiple layers on a plastic covering paper support for continuous traveling of the aforementioned coating liquid composition and a support such as plastic film. The support can be made of any material; it can be paper coated with polyethylene and polyethylene terephthalate, paper support made of natural pulse or synthetic pulp, polyvinyl chloride sheet, polypropylene which may contain white pigment, polyethylene terephthalate support and baryta paper.

Photosensitive materials are manufactured by drying the support with multiple layers coated simultaneously. After having been coating and drying, they are cut into the size conforming to the required product form and are lightproof packaged. Then they are sent to the exposure department 6.

Further, photosensitive materials may be stored at a managed temperature or humidity. In order to cross link the binder and to get a desired film strength, it may be preferable that the photosensitive materials are stored at a managed temperature or humidity for a predetermined time in any one of the processes between coating and drying of these photosensitive materials and development thereof.

It is also possible to arrange such a configuration that the manufacturing department 5 and exposure department 6 are connected by one and same line, and light proof processing can be omitted when photosensitive materials are delivered. This will make it possible to omit the step of packaging, whereby time and effort as well cost can be cut down.

When photosensitive material production at the manufacturing department 5 and delivery at the exposure department 6 have been completed in the manner described above, photosensitive material production and delivery termination data is created by the manager of the manufacturing department 5 or the like using the input unit 55 of the manufacturing department terminal 50. At the same time, the inventory data is updated. The aforementioned production and delivery termination data and updated inventory data are sent to the management server 30 in conformity to control by the CPU5 of the manufacturing department terminal 50 (Step S1A4). Having received the data, the management server 30 rewrites the inventory data 333C based on the aforementioned data (Step S1A5).

Figure 10:
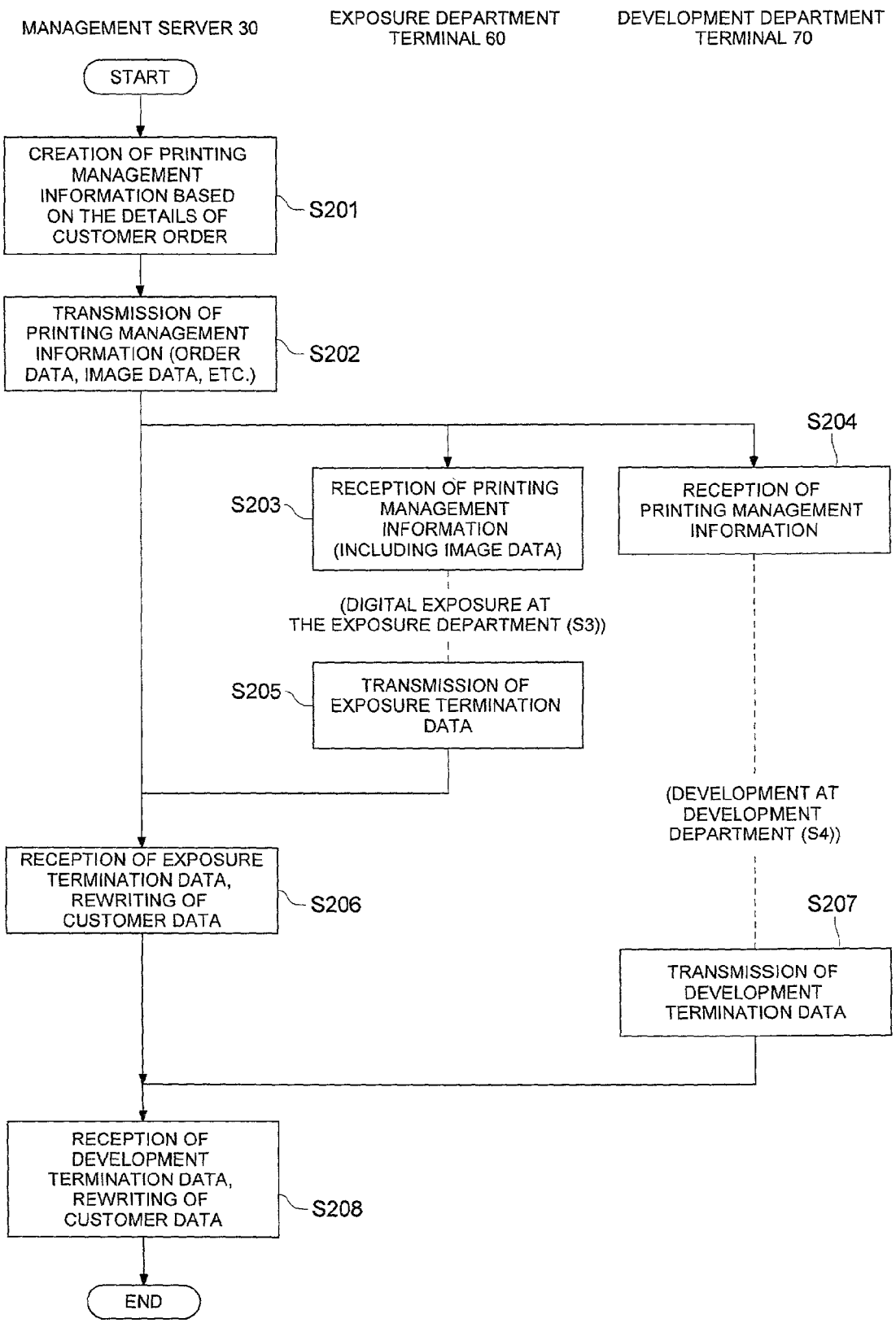
FIG. 10 is a flow chart representing the detailed operations of printing management processing in step S2 of FIG. 7.

The following describes the processing of printing management (Step S2) among the management server 30, exposure department terminal 60 and development department terminal 70 in FIG. 7, with reference to the flow chart in FIG. 10.

In Step S201, having received printing order from the customer terminal 20 in Step S1, the CPU31 of the management server 30 reads out a scheduled management program 331C stored in the application database 331, and loads it into the RAM32, where it is started to create the printing management information including the scheduled printing management information in conformity to the program 331C (Step S201).

The printing management information is the instruction data to instruct the exposure management department 6 and development management department 7 to implement printing based on the details of the customer 2 order. It includes such order data such the number of prints and custom order as well as image data, in addition to the work schedule information which is set to meet delivery requirements specified by the customer 2.

Then the CPU3 of the management server 30 sends the aforementioned printing management information to the exposure department terminal 60 and development department terminal 70 (Step S202).

The CPU61 of exposure department terminal 60 receives the printing management information, which is loaded in the order acceptance database (Step S203). Printing management information received at this time is accompanied by the image data sent from customer 2.

At the same time, the CPU71 of the development department terminal 70 receives printing management information and loads it into the acceptance database 731 (Step S204). Processing of printing management is terminated with the completion of this step (Step S2).

The following describes processing of digital exposure (Step S3 in FIG. 7) implemented by the exposure department 6 based on the aforementioned printing management information: It should be noted that this digital exposure process is the same as the commonly practiced method, and is not restricted to the method described below.

Since the image data sent from the customer 2 is handled in a digital form, the following methods are available for exposure based on digital image data: In one method, an image is formed on the CRT (cathode ray tube) and the formed image is again formed on the photosensitive material supplied from the manufacturing department 5, whereby printing is performed. In another method, the digital image is displayed on the liquid crystal display element on the transmissive or reflective LCD. After having been converted as required, light from a light source is led to the liquid crystal display element and the light of the transmitted or reflected image is printed on the photosensitive material. In still another method, a DMD element is used instead of a liquid crystal display element. After having been color-converted as required, light from the light source is led to the DMD display element, and the light of reflected image is printed on the photosensitive material. These methods are characterized by simultaneous exposure of the two-dimensional range (plane surface). A further method is a so-called scanning exposure method wherein one-dimensional range (linear range) is exposed so that scanning is performed by changing the intensity of laser beam based on the digital information. Digital exposure is carried out according to these methods.

Scanning exposure by beam is commonly performed by a combination of linear exposure by beam (raster exposure: horizontal scanning) and relative traveling of a photosensitive material in the direction vertical to this linear exposure (vertical scanning). For example, the photosensitive material is fixed on the outer periphery or inner periphery of a cylindrical drum, and the drum is rotated with beam kept applied thereto, whereby horizontal scanning is performed. At the same time, the light source is moved vertically in the direction of drum rotation, whereby vertical scanning is performed. Alternatively, the reflected beam is made to scan horizontally in the direction of polygon mirror rotation by applying beam to the rotating polygon mirror (horizontal scanning); at the same time, the photosensitive material is moved vertically with respect to the direction of polygon rotation, whereby vertical scanning is performed. These polygon methods are frequently employed. Further, when use of made of an exposure apparatus wherein light sources are arranged in an array in excess of the width of the photosensitive material to be exposed, the portion corresponding to horizontal scanning can be considered to have been replaced by light sources in arranged in an array. This can be incorporated in the category of scanning exposure.

The light sources preferably used in scanning exposure include a light emitting diode (LED), a gas laser, a semiconductor laser (LD), a combination between a LD or solid laser with LD used as an exciting light source and second harmonic wave change element (so-called SHG element), a combination between a VFPH element and chemical filter, a combination among a PLZT element, halogen lamp and optical filter, a combination between a tungsten light and band pass filter, a device which ensures that beam coming from the aforementioned CRT, liquid crystal display element and DMD element will become linear. Further, for the purpose of avoiding uneven exposure streaks caused by variations of devices or others in scanning exposure, it is possible to adopt a method wherein a plurality of small light sources are combined to ensure that the adverse effect of variations will be dispersed. In the processing of this digital exposure, the present invention is configured in such a way as to handle image processing when fulfilling a custom order of the customer 2, e.g. superimposition of other images and letters.

The photosensitive material digitally exposed in the aforementioned manner is sent immediately to the development department 7. Processing of digital exposure (Step S3) is now complete. Upon completion of digital exposure, the job termination data is sent to the management server 30 via the exposure department terminal 60 (Step S205). Upon receipt of the aforementioned job termination data, the management server 30 updates the data of customer database 332 (Step S206).

The following describes processing of development by development department 7 in Step S4 in FIG. 7:

In the photosensitive material development process, the photosensitive material is immersed in coloring developer for coloring development. The major coloring developer used in this case is aminophenol and p-phenylene diamide compound extensively used in various colored photographing process. Further, the coloring developer can be made by adding a known developer component compound to the aforementioned major coloring developer. Commonly used agents include an alkali agent having a pH buffering function, a development inhibitor such as chloride ion and benzo triazole, preservatives and a chelating agent.

The coloring development temperature is normally 15 degrees Celsius or more. Commonly used temperature is within the range from 20 to 50. The coloring development time is from 10 seconds to 4 minutes.

When running treatment is made with coloring developer being replenished continuously, the overflow of the coloring developer must be reduced to minimize pollution. For this purpose, the amount of coloring developer to be replenished is from 20 to 100 cc for each square meter of photosensitive material.

After having been subjected to coloring development, the photosensitive material is bleached and fused. Bleaching and fusing can be performed simultaneously. After fusing, the material is normally washed with water. It can be subjected to stabilization instead of water washing. A roller transport method wherein the photosensitive material is transported as it is sandwiched between rollers arranged in a treatment tank, or an endless belt method wherein the photosensitive material is fixed on a belt and is transported can be used as a development apparatus used for development of the photosensitive material according to the present invention. It is also possible to use a treatment tank formed in a slit which is filled with developer, and, at the same time, the photosensitive material is transported.

Upon completion of development (Step S4) in the aforementioned manner, the development termination data is sent to the management server 30 (Step S207) via the development department terminal 70 in response to the data input by the manager of the development department 7. Having receiving this development termination data, the management server 30 updates the data of the customer database 332 (Step S208).

Printing is completed by termination of the development. In Step S5 of FIG. 7, the product is handed over to the customer 2, and settlement of accounts takes place.

As described above, in the printing management system 1 of the present invention, reception of the customer 2 order, photosensitive material production control, digital exposure, development and other printing processes are all placed under the integrated management of the management server 30, whereby smooth and efficient printing is ensured.

Since the management server 30 allows photosensitive material production volume and production time period to be determined in conformity to printing order, there is little need for worry about excessive storage or insufficient storage of photosensitive materials based on the prior art estimated production. Delivery from the manufacturing department 5 to the exposure department 6 is also placed under scheduled management with the result that secular deterioration of photosensitive materials can be avoided. Furthermore, the printing department (digital exposure department 6 and development department 7) need not take the trouble of placing an order for photosensitive materials or carrying out performance management.

If an agent sales method is used according to the prior art, the customers 2 are limited to those living close to an agent, with the result that the number of orders for printing is limited. Accordingly, installation of a photofinishing lab engaged in exposure and development in a photosensitive material manufacturing shop will give rise to imbalance between the photosensitive material production volume and the volume of printing order, and is economically not viable, according to this prior art. By contrast, orders received via the communications network 4 such as the Internet are not affected by geographical factors, and printing order can be accepted for 24 hours without sales personnel. This promises large orders, and therefore makes it economically viable to build a photosensitive material manufacturing shop (manufacturing department 5) and a photofinishing lab (exposure department 6 and development department 7) in one and the same site. The manufacturing shop and photofinishing lab constructed at one site simplify the light proof packages during transportation of photosensitive materials and storage facilities for minimizing performance deterioration. Thus, high-quality printing can be provided at low prices because both prevention of secular deterioration of photosensitive materials and cost reduction are ensured.

It should be noted, however, that the above embodiment is only an example, and may be modified as desired. For example, the photosensitive material production method is not limited to the ones explained in the present embodiment. Any method may be used if only a photosensitive material for printing can be manufactured. Furthermore, image data digital exposure and development are not restricted to the aforementioned methods; any method may be used if only printing can be completed.

The printing management system 1 according to the present invention may be configured in such a way that manufacturing, exposure and development are automatically carried out and controlled based on the instruction data sent to each terminal from a management server 30, wherein a manufacturing department terminal 50 is connected with a photosensitive material manufacturing apparatus, an exposure department terminal 80 is connected with a digital exposure apparatus, and a development department terminal 70 s connected with a development apparatus.

Further, a management server 30, manufacturing department terminal 50, exposure department terminal 60 and development department terminal 70 may be connected with one another via the LAN8 in such a way as to allow exchange of data among them. For example, delivery information may be exchanged between a manufacturing department terminal and exposure department terminal 60. Further, connection may be made via the WAN and leased line or the like in addition to LAN8.

According to the invention of embodiment (1), production control information for the management of photosensitive material production volume and production time period is created by the production control information creating means based on the order data received from the customer terminal by receiving means, and this production control information is sent to the manufacturing department terminal by the production control information transmission means. This ensures production to be carried out in conformity to the order received from customers, thereby preventing excessive storage or insufficient storage of photosensitive materials. It also allows a production schedule to be formulated in conformity to possible deterioration of photosensitive materials.

Further, order data from customers is sent to the printing department terminal by the order data transmission means, facilitating processing of printing order.

Thus, this embodiment ensures efficient production while minimizing the secular change of photosensitive materials, and provides high-quality printing at low prices at the same time.

According to the invention of embodiment (2), the same effect as that of embodiment (1) can be obtained. Not only that, printing management information for scheduled management of printing is created by the printing management information creating means based on the order data, and this printing management information is sent to the printing department terminal by the printing management information transmission means. This enables effective printing in conformity to the amount of order accepted.

According to the invention of embodiment (3), the same effect as that of embodiment (1) or (2) can be obtained. Not only that, the aforementioned production control information provides production control information for adjusting production costs and production time period in such a way as to ensure the optimum inventory of the aforementioned photosensitive materials. This makes it possible to achieve the effective production because management is carried out in such a way that the secular deterioration of photosensitive materials can be minimized while the possibility of insufficient storage is eliminated.

According to the invention of embodiment (4), the same effect as that of embodiment (3) can be obtained. Not only that, the optimum inventory volume setting means allows the optimum inventory volume to be set in such a way that the photosensitive materials can be used up within a predetermined period of use, based on the aforementioned order data. This permits photosensitive materials to be consumed before the time of performance deterioration, and eliminates the need of excessive management of photosensitive materials.

According to the invention of embodiment (5), the same effect as that of embodiment (4) can be obtained. Not only that, usable period setting means allows the period of using the photosensitive material to be set based on the input of temperature in the warehouse storing the aforementioned photosensitive materials. This makes it possible to adjust the period of use in conformity to the storage environment.

The invention of embodiment (6) allows printing order, photosensitive material production control and printing management data to be exchanged via a communications line. This enables integrated management of all the processing related to printing, thereby allowing production of photosensitive materials in conformity to the amount of order accepted.

Thus, this embodiment ensures efficient production while minimizing performance deterioration of photosensitive materials, and provides high-quality printing at low prices at the same time.

According to the invention of embodiment (7), the same effect as that of embodiment (6) can be obtained. Not only that, printing is placed under scheduled management based on printing management information, whereby efficient printing is ensured.

According to the invention of embodiment (8), printing order, photosensitive material production control and printing management are performed in an integrated manner whereby photosensitive materials are produced in conformity to the amount of order accepted. This permits production adjustment to be made in conformity to the photosensitive material storage and secular performance deterioration in the manufacturing department. Further, use of a management server permits a great many orders to be received. Photosensitive materials produced in conformity to the received orders are used for printing in the printing department, and the photosensitive material manufacturing department and printing department can be installed close to each other, thereby cutting down transportation costs and reducing the amount of lightproof package.

According to the invention of embodiment (9), the same effect as that of embodiment (8) can be obtained. Not only that, the printing department allows printing to be performed based on printing management information, whereby more effective printing is ensured.

What is claimed is:

1. A print management server to conduct a light sensitive material production management and a printing management and being connected through a network with a customer terminal provided at a customer to order a print of an image based on image data, a manufacturing section terminal provided at a manufacturing section to produce a light sensitive material, and a printing section terminal provided at a printing section to conduct printing by using the light sensitive material produced by the manufacturing section, the print management server comprising:
- a receiving section to receive order data including the image data from the customer terminal;
- a production management information preparing section to prepare production management information to administrate a production amount and a production time for the light sensitive material based on the order data received by the receiving section;
- a production management information transmitting section to transmit the production management information prepared by the production management information preparing section; and
- an order data transmitting section to transmit the order data received by the receiving section to the printing section terminal.

2. The print management server of claim 1, further comprising:
- a printing management information preparing section to prepare printing management information to administrate a schedule of printing based on the order data received by the receiving section; and a printing management information transmitting section to transmit the printing management information prepared by the printing management information preparing section to the printing section terminal.

3. The print management server of claim 1, wherein the production management information preparing section prepares production management information to adjust a production amount and a production time for the light sensitive material so as to make a stock amount of the light sensitive material to be a proper stock amount.

4. The print management server of claim 3, further comprising:
- a proper stock amount setting section to set the proper stock amount of the light sensitive material based on the order data so as to consume the light sensitive material within a predetermined usable time limit of the light sensitive material.

5. The print management server of claim 4, wherein a usable time limit setting section sets the usable time limit of the light sensitive material based on an inputted temperature in a warehouse preserving the light sensitive material.

6. A print management system, comprising:
- a customer terminal provided at a customer to order a print of an image based on image data;
- a manufacturing section terminal provided at a manufacturing section to produce a light sensitive material;
- a printing section terminal provided at a printing section to conduct printing by using the light sensitive material produced by the manufacturing section; and
- a print management server to conduct a light sensitive material production management and a printing management and being connected through a network with the customer terminal, the, manufacturing section terminal and the printing section terminal;
- the customer terminal having
  - an order data transmitting section to transmit the order data including the image information to the print management server;
- the print management server having
  - a production management information preparing section to receive the order data transmitted from the order data transmitting section and to prepare production management information to administrate a production amount and a production time for the light sensitive material based on the received order data;
  - a production management information transmitting section to transmit the production management information prepared by the production management information preparing section; and
  - an order data transmitting section to transmit the received order data to the printing section terminal;
- the manufacturing section terminal having
  - a production management information receiving section to receive the production management information transmitted from the production management information transmitting section; and
- the printing section terminal having an order data receiving section to receive the order data transmitted from the order data transmitting section.

7. The print management system of claim 6, wherein the print management server has
- a printing management information preparing section to prepare printing management information to administrate a schedule of printing based on the order data; and
- a printing management information transmitting section to transmit the printing management information prepared by the printing management information preparing section to the printing section terminal; and
- the printing section terminal has a printing management information receiving section to receive the printing management information transmitted from the printing management information transmitting section.

8. A printing method by using the print management system of claim 7, comprising:
- setting a proper stock amount of the light sensitive material by the print management server based on the order data so as to consume the light sensitive material within a predetermined usable time limit of the light sensitive material;
- preparing production management information to adjust the production amount and the production time for the light sensitive material so as to make a stock amount of the light sensitive material stored in a memory to be a proper stock amount;
- producing the light sensitive material by the manufacturing section based on the production management information received by the production management information receiving section; and
- conducting printing by the printing section based on the order data transmitted by the order data receiving section.

9. The printing method of claim 8, wherein the step of printing is conducted based on the printing management information transmitted from the printing management information transmitting section.

* * * * *